United States Patent [19]
Sugi et al.

[11] Patent Number: 5,699,341
[45] Date of Patent: Dec. 16, 1997

[54] OPTICAL DISK APPARATUS AND OPTICAL HEAD THEREOF

[75] Inventors: Yasuyuki Sugi, Ibaragi-ken; Toshio Sugiyama, Yokohama; Nobuo Imada, Chigasaki; Hidenori Shinohara, Hitachinaka; Yukio Fukui, Tokyo, all of Japan

[73] Assignee: Hitachi, Ltd., Tokyo, Japan

[21] Appl. No.: 711,466

[22] Filed: Sep. 11, 1996

[30] Foreign Application Priority Data

Sep. 12, 1995 [JP] Japan .................................. 7-234268
Dec. 8, 1995 [JP] Japan .................................. 7-319978

[51] Int. Cl.⁶ ........................................... G11B 7/00
[52] U.S. Cl. ..................... 369/112; 369/94; 369/117; 369/118
[58] Field of Search ........................ 369/112, 94, 117, 369/118

[56] References Cited

U.S. PATENT DOCUMENTS

| | | | |
|---|---|---|---|
| 5,281,797 | 1/1994 | Tatsuno et al. | 369/118 |
| 5,526,338 | 6/1996 | Hasman et al. | 369/112 |

FOREIGN PATENT DOCUMENTS

| | | |
|---|---|---|
| 0 468 468 A2 | 7/1991 | European Pat. Off. . |
| 0 470 807 A1 | 8/1991 | European Pat. Off. . |
| 0 537 904 A2 | 9/1992 | European Pat. Off. . |
| 0 610 055 A2 | 1/1994 | European Pat. Off. . |
| 62-158318 | 1/1989 | Japan . |
| 6020298 | 1/1994 | Japan . |
| 7065409 | 3/1995 | Japan . |
| 7-182690 | 7/1995 | Japan . |

*Primary Examiner*—David C. Nelms
*Assistant Examiner*—Kim-Kwok Chu
*Attorney, Agent, or Firm*—Fay, Sharpe, Beall, Fagan, Minnich & McKee

[57] ABSTRACT

The present invention comprises an arrangement with removable optical element having a predetermined focal distance in the light path between a light source and an objective lens, so as to insert said optical element into the light path between the light source and the objective lens for playing back or recording onto one type of thickness of disk plates, as well as to remove it therefrom for playing back or recording onto another type of thickness of disk plates. Alternatively, by retaining variably the distance between the light source and the collimator lens, the distance between the light source and the collimator lens along with the light path is variably changed according to the thickness of the disk plate being inserted. Then by determining the type of the disk inserted and accordingly selectably inserting/removing the optical element, only one objective lens may be used to conform to the disk plates having different thicknesses.

22 Claims, 10 Drawing Sheets

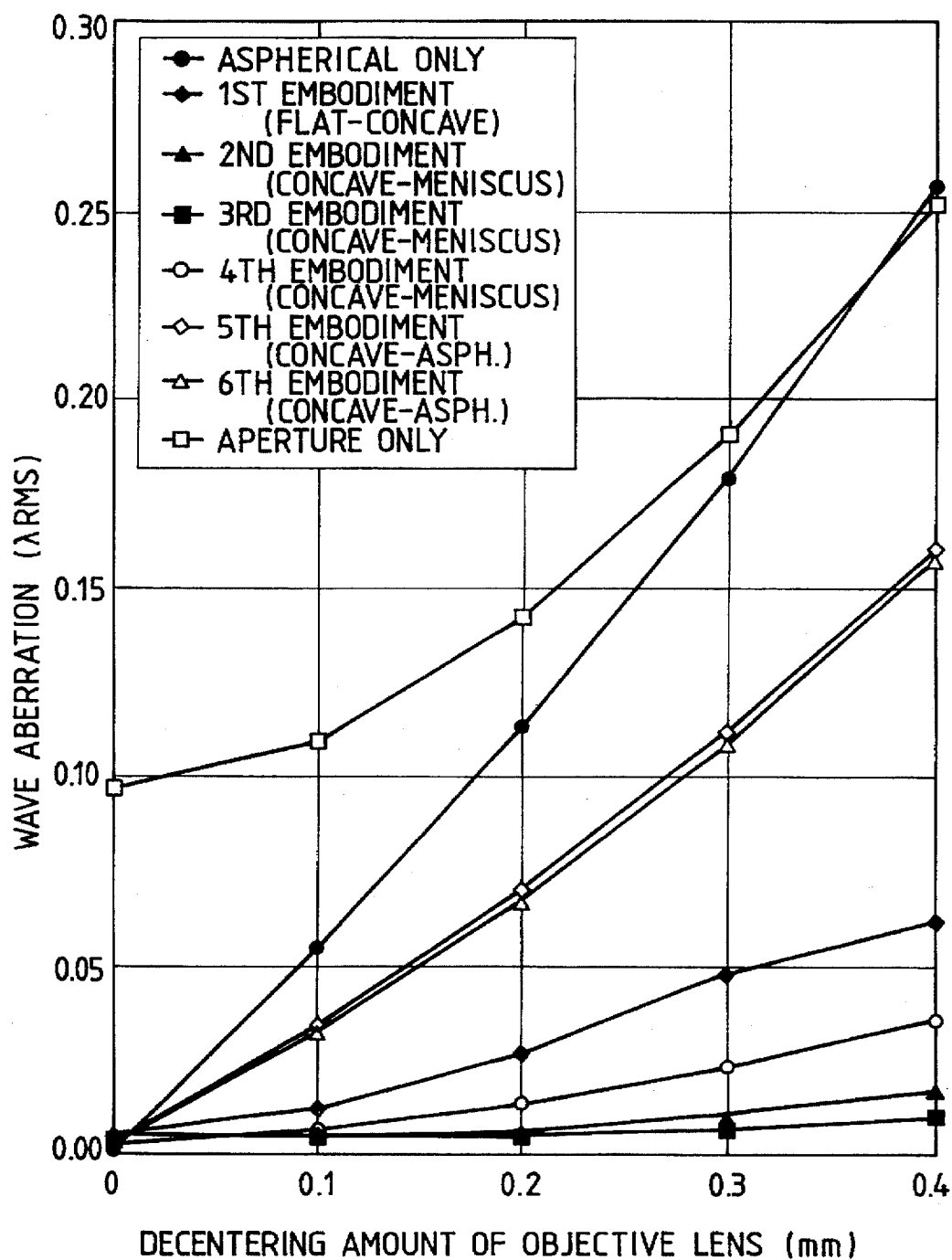

OPTICAL DISK APPARATUS AND OPTICAL HEAD THEREOF

BACKGROUND OF THE INVENTION

The present invention relates to an optical disk apparatus and optical head thereof in which disk plates of different thickness from the side in the face of the optical head to the information recording surface (hereinafter, the thickness) such as high density recording or play back disks and Compact Discs (CD) may be played back and/or recorded.

An example of the optical disk apparatus of the prior art in which one single apparatus being capable of playing back or reading/writing disks having different thickness is disclosed in the Japanese Patent Laid-Open Hei 4-95224, which apparatus is used for converging laser light beam into an optical disk recording layer without the need of interchanging objective lens for each respective of disk plates having different thicknesses.

SUMMARY OF THE INVENTION

The inventors of the present invention have found that said example of the prior art requires two or more sets of objective lens, so that the moving parts of the actuator have been large and complex, due to the needs of servo-activity for focusing and tracking. The present invention has been made for overcoming this problem.

For this reason, in accordance with the present invention, an optical element having predetermined positive- and negative focusing distance in the light path between the light source and the objective lens are made capable of removably being insertion and extraction from within the light path, with said optical element being inserted in the light path between the light source and the objective lens for reading or writing a disk plate of one thickness, and with said optical element being removed from within the light path between the light source and the objective lens for a disk plate of another different thickness, such that only one single objective lens may be conformed to disks having different thicknesses.

Otherwise, the distance between the light source and the collimator lens along with the light path each from other is changeably maintained so as to alter the distance between the light source and the collimator lens along with the light path each from other in accordance with the thickness of the disk plate in order to match only one single objective lens to the disks of different thicknesses.

Then, the type of the disk inserted is determined so as to insert/remove selectively the optical element.

With the arrangement in accordance with the present invention, laser beam may be converged onto the disk plate within a predetermined tolerance of aberration by using the objective lens and the optical element having predetermined positive- and negative focusing distance, and laser beam may be converged onto the disk plate having another thickness within the predetermined tolerance of aberration by using solely the objective lens.

Alternatively, with the arrangement above, the distance from the light source to the collimator lens each from other along with the light path may be altered for changing convergence angle or divergence angle of the laser beam incident to the objective lens so as to be able to focus the laser beam onto the disk plate.

Thus the type of the disk inserted into the apparatus may be determined for exchanging the optical element.

As stated above, in accordance with the present invention, the disks having different thicknesses may be written or read out with only one single objective lens. The present invention has an effect in that the moving parts of the actuator may become less complex and may be composed in a simpler way.

BRIEF DESCRIPTION OF THE DRAWINGS

These and other features, objects and advantages of the present invention will become more apparent from the following description when taken in conjunction with the accompanying drawings wherein:

FIG. 7 shows a graph of wave aberration with the objective lens decentered;

DETAILED DESCRIPTION OF PREFERRED EMBODIMENTS

In the following description of the present preferred embodiments the disks are of two types of thickness.

Figure 1A:
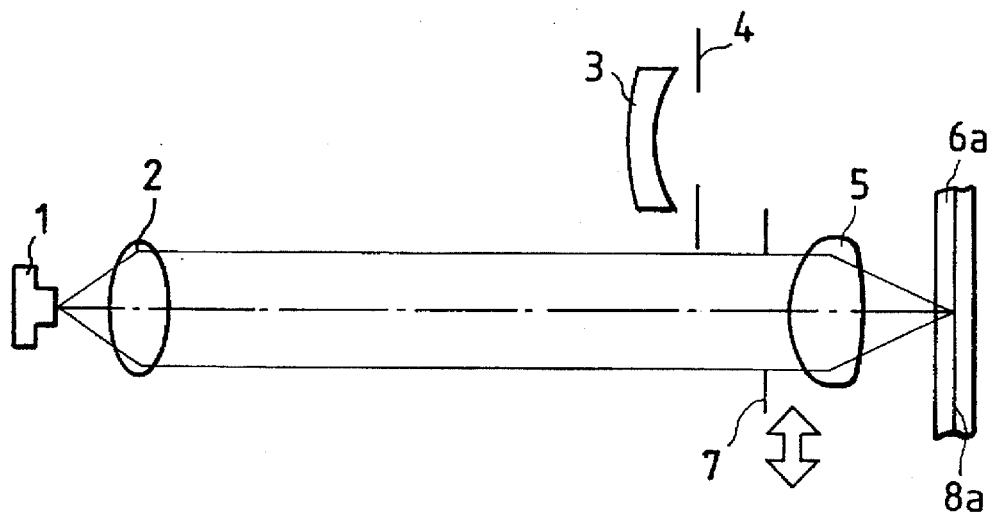
FIGS. 1(a) and 1(b) shows a transverse sectional view indicating the arrangement of first to sixth embodiment of the present invention.
Figure 1B:
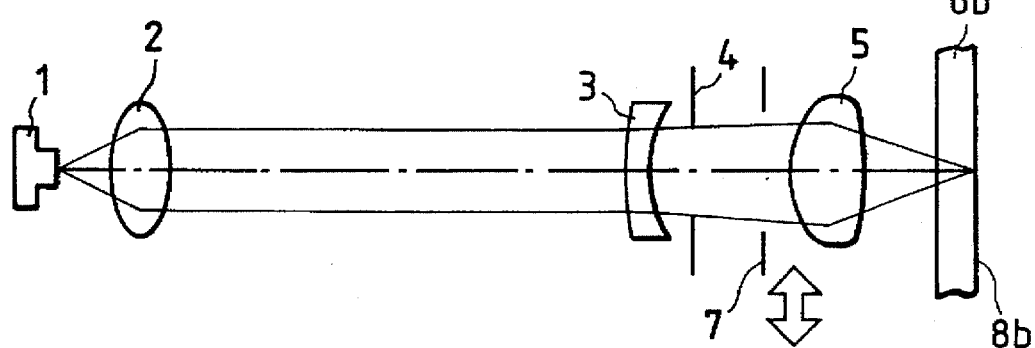

FIGS. 1(a) and 1(b) shows a schematic diagram showing the arrangement of an optical disk apparatus and the optical head thereof in accordance with first to sixth embodiment of the present invention. The reference numeral 6a designates a disk composed of two 0.6 mm plates adhered (for high density recording or playing back), 6b designates to a 1.2 mm single disk plate (CD).

In FIG. 1A, the light emitted from the laser source 1 passes through a collimator lens 2 to become parallel light, then passes through an aperture 7 to determine the diameter of the light bundle so as to be NA=0.6 at the focusing side, then passes through an objective lens to be converged to focus on the recording surface 8a of the disk plate 6a. The objective lens 5 is designed such that the aberration becomes best with the disk thickness 0.6 mm and focusing side NA=0.6.

In FIG. 1B the light beam emitted from the laser source 1 passes through the collimator lens 2 to be parallel, then passes through an concave lens 3 to become divergent light, thereafter passes through the aperture 4 to determine the diameter of the light bundle with NA=0.4 at the focusing side, then passes through the objective lens 5 to be converged onto the recording surface 8b of the disk plate 6b. The concave lens 3 is designed such that the best aberration may be obtained with the disk thickness 1.2 mm, NA=0.4 at the focusing side, when the objective lens 5 is used.

Figure 2:
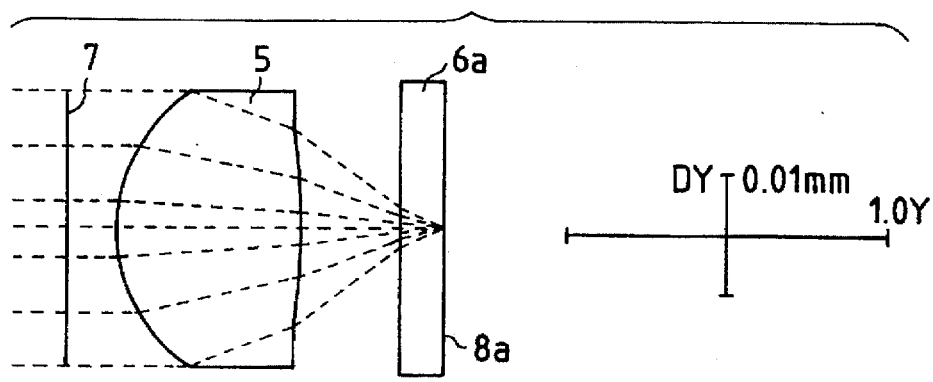
FIG. 2 shows a transverse sectional and lateral aberration diagram indicating the light bundle in FIG. 1A.

The aberration correction, i.e., maintaining said aberration in its best condition will be described below. FIG. 2 shows an diagram of the light trace in proximity of the objective lens in FIG. 1A and an diagram of lateral aberration on the light axis at the image plane (image height 0 mm). The lateral aberration view is indicated with the amount of the lateral aberration DY (mm) in the Y axis and the height of the pupil in the X axis through which the light beam passes. In FIG. 2, the light beam will be best focused onto the disk recording surface 8a (i.e., image plane) and the aberration is well corrected to be less than 0.001 mm of lateral aberration when NA=0.6 and disk thickness 0.6 mm.

Figure 3:
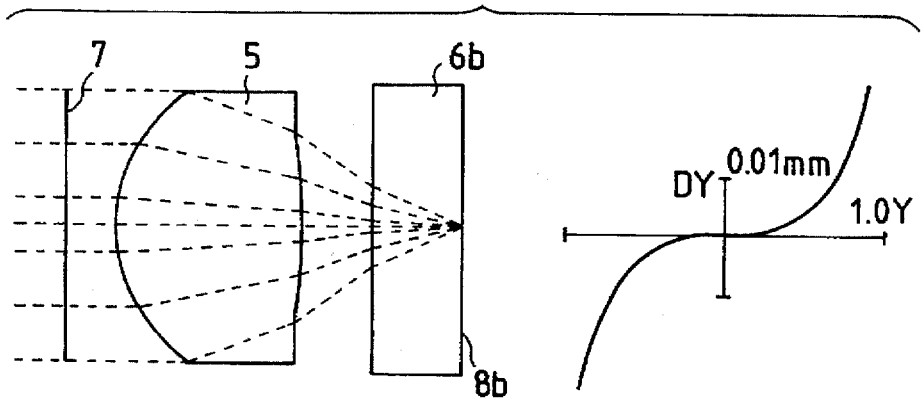
FIG. 3 shows a transverse sectional and lateral aberration diagram indicating the light bundle when the thickness of the disk plate becomes thicker than that in FIG. 2.

FIG. 3 shows a view of light trace and of lateral aberration on the light axis at the image plane (image height 0 mm) when NA=0.6 mm and the disk plate thickness becomes 1.2 mm as compared with FIG. 2. The figure indicates that the aberration correction is not achieved since the light beam cannot be converged into a spot on the disk recording surface 8b, and the lateral aberration is more than 0.02 mm. That is, the objective lens 5 may not maintain the good aberration condition if the thickness of the disk plate is changed from 0.6 mm to 1.2 mm. The condition as shown in FIG. 3 also shows the spherical aberration is aggravated toward the overcorrection.

Figure 4:
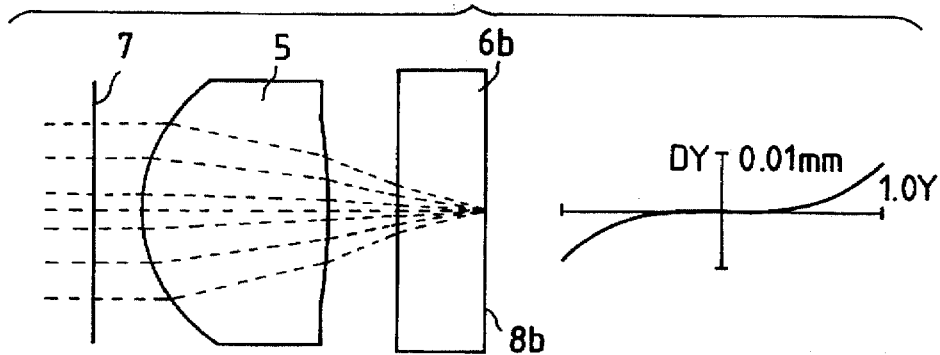
FIG. 4 shows a transverse sectional and lateral aberration diagram indicating the light bundle when the numerical aperture becomes smaller than that of FIG. 3.

FIG. 4 shows a view of light trace and of lateral aberration on the light axis at the image plane (image height 0 mm) when NA becomes 0.4 and the disk plate thickness rests 1.2 mm as compared with FIG. 3. NA has changed to 0.4 from 0.6, thus even though the amount of lateral aberration is decreased there still exists 0.01 mm of aberration, meaning poor condition. In this condition the spherical aberration is also degraded in the over compensated direction.

To improve the over compensated spherical aberration, it might be conceivable that the additional spherical aberration be added. To achieve this, (A) insert an optical element having negative focusing distance at the light source side of the objective lens (such as a concave lens) in order to incident the light into the objective lens as divergent light;

(B) move either the light source or the collimator lens along with the light axis so as to cause the light beam incident to the objective lens to enter as divergent light; and (C) insert an aspherical correction lens.

The above (A) will be described in great detail below. When inserting a concave lens, the light beam has to be divergent so as to cancel spherical aberration over corrected in the condition of FIG. 4. To achieve this following equation (1) should be satisfied:

$$3 < |f2 * (t1-t2)/f1| < 25, \quad \text{eq. (1)}$$

where f2: the focusing distance of the concave lens, (t1–t2): the difference of thickness between disk substrates of different thicknesses, and f1: the focusing distance of the objective lens.

In case the value is smaller than the minimum limit of the equation (1) above, then the focusing distance f2 of the concave lens multiplied by the difference of the thickness of the disk substrate (t1–t2) will be too much small for the focusing distance f1 of the objective lens. Since the difference of the disk base substrate to be aberration corrected and the focusing distance of the objective lens are predefined, the focusing distance f2 of the concave lens therefore is too small, thus the power (the inverse of the focusing distance) of the concave lens becomes too large. If the power of the concave lens is too large then the light beam incident to the objective lens will be also too divert, then as a consequence the correction of the aberration will be difficult. If the value is larger than the maximum limit in the equation (1) above then the aberration characteristics at the time of objective lens decentered as described below may be degraded.

The optical design data of the concave lens for the first preferred embodiment based on the above criteria will be as follows:

wavelength: 650 nm, r1=infinite, d1=1, n1=1.52246, r2=15.5, d2=0.65, r3=infinite (aperture), d3=19.35, b3=1.59, r4=infinite (aperture), d4=0.65, and b4=3.763.

Figure 6:
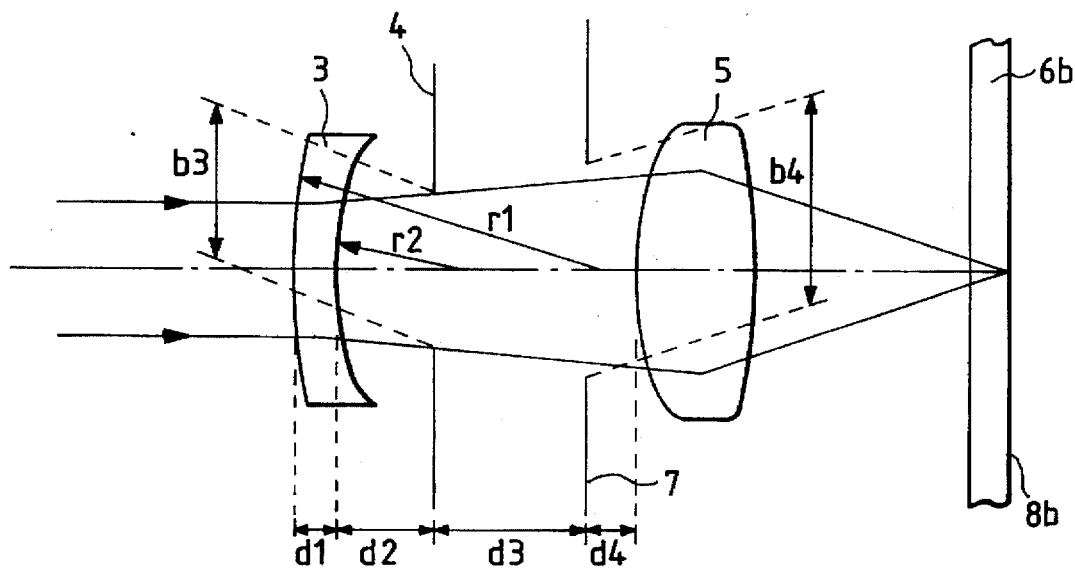
FIG. 6 shows reference numerals in first to sixth embodiment according to the present invention.

Above cited r1, r2, d1, d2, d3, d4, b3, and b4 are as shown in FIG. 6. r1 designates to the curvature of respective surface (the value is positive when the center of the curvature lies right hand of the intersection of the surface with the light axis), d1 designates the distance to the next surface along with the light axis, b3 and b4 are the diameters of the aperture, n1 designates to the index of refraction of the concave lens. As the objective lens 5 is aspherical, focusing distance will be f1=3.136 mm.

The focusing distance of the concave lens will be, therefore, according to the above figures, f2=–29.667 mm. Assumed that the thickness of the disks for high density is t1=0.6 mm, the thickness of the CD disks is t2=1.2 mm, thus $$\text{eq. (1)} = |-29.667 * (0.6 - 1.2)/3.136|$$
$$= 5.6761.$$

Figure 5:
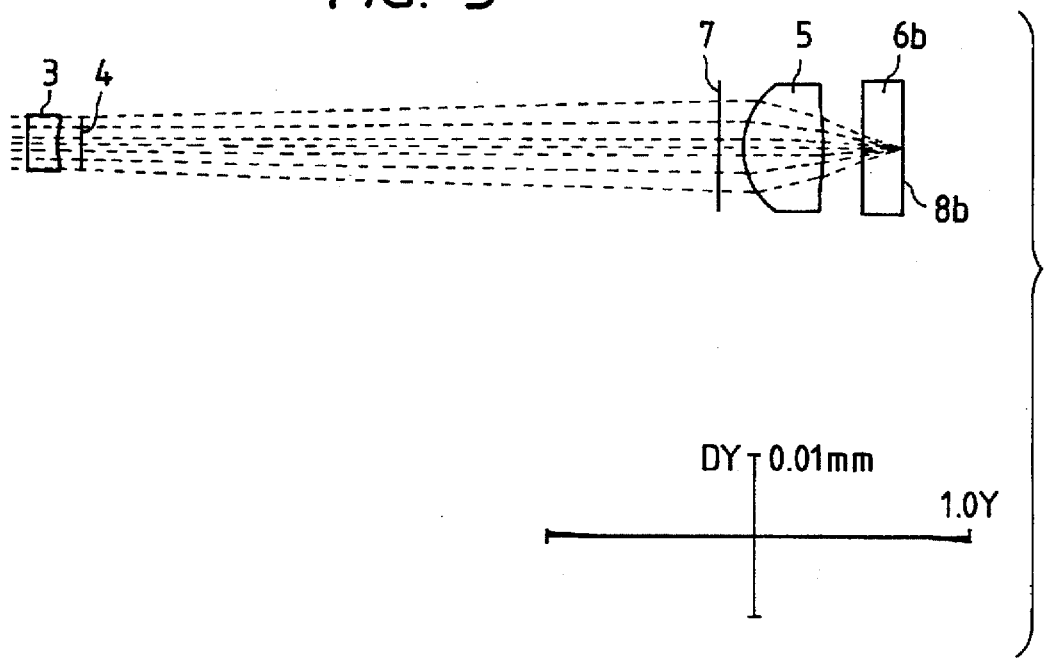
FIG. 5 shows a transverse sectional and lateral aberration diagram indicating the light bundle in FIG. 1B in accordance with the first embodiment of the present invention.

In the context of FIG. 1A, image side NA=0.6, disk thickness 0.6 mm, and the wave aberration is 0.003 λrms, which is well corrected by the objective lens 5. In the context of FIG. 1B, image side NA=0.4, disk thickness 1.2 mm, and the wave aberration is 0.006 λrms, which is also well corrected. FIG. 5 shows a transverse sectional and lateral aberration diagram indicating the light bundle in FIG. 1B in accordance with the first embodiment of the present invention.

In FIGS. 1(a) and 1(b), the objective lens 5 and the aperture 7 are moved together approximately 0.2 to 0.3 mm, and the maximum of 0.4 mm in the direction of the arrow shown in the figure, for the operation of tracking servo for the optical disk (this amount of movement is referred to as the eccentricity hereinafter). In FIG. 1A, as incident light beam to the objective lens 5 is parallel light beam for no aberration, no degradation by aberration occurs if there is some decentering of the objective lens, whereas in FIG. 1B as incident light beam to the objective lens 5 is not parallel light beam without aberration, some degradation by aberration may occur if there is some decentering of the objective lens 5.

Accordingly, in the present invention, important is to minimize the degradation by aberration as small as possible when the objective lens 5 is decentering in the context of FIG. 1B. To achieve this the value in expression (1) is to be less than 25, the upper limit value. That is, if the value in expression (1) exceeds 25, the image distance of the optical element having negative focal length (such as concave lenses) becomes too large to decrease image power to cause the aberration correction by means of aspherical surface to be necessarily done for the most part. When the effect of aspherical lens is predominant aberration characteristics at decentering of the objective lens 5 may be degraded. For instance, in the context of FIG. 1B it may be conceivable that an aspherical correcting plate may be inserted which has infinite focal distance instead of the concave lens 3. However this alternative may well correct aberration only at the amount of decentering of 0, and may have a large amount of degradation by aberration at the time of decentering.

The values of wave aberration at the decentering of the objective lens 5 and the aperture 7 in the context of FIG. 1B will be shown below with an example with the aspherical correction plate having infinite focal distance and said first embodiment of the present invention:

Aspherical correction plate: value of eq. (1)=infinite

| with decentering of: (mm) | wave aberration of: ($\lambda$rms) |
| --- | --- |
| 0 | 0.001 |
| 0.1 | 0.054 |
| 0.2 | 0.113 |
| 0.3 | 0.179 |
| 0.4 | 0.257 |

First embodiment: value of eq. (1)=5.6761

| with decentering of: (mm) | wave aberration of: ($\lambda$rms) |
| --- | --- |
| 0 | 0.006 |
| 0.1 | 0.012 |
| 0.2 | 0.027 |
| 0.3 | 0.048 |
| 0.4 | 0.062 |

It is clear that when comparing with the example with the aspherical correction plate having infinite value for eq. (1) (because of f2=infinite), the first embodiment has much better characteristics of the wave aberration at decentering of the objective lens. In addition, if the tolerance threshold value of the wave aberration is set to 0.07 $\lambda$rms, of the Marechal criterion, the tolerable decentering range for the aspherical correction plate will be about 0.1 mm, while the first embodiment of the present invention will have that of about 0.4 mm, which indicates the more favorable.

The second embodiment will be described below. This embodiment comprises the same basic structure as the first embodiment cited above as shown in FIGS. 1(a) and 1(b), except for the concave lens 3 and the aperture 4. The concave lens 3 which is flat-concave lens having r1=infinite in the first embodiment should be a meniscus concave lens having the same sign for both r1 and r2 for better correction when considering in addition the decentering of the objective lens 5 and the aperture 7. Followings are exemplary values:

Wavelength=650 nm,
r1=50,
d1=1,
n1=1.52246,
r2=14,
d2=8.5,
r3=infinite (aperture),
d3=6.5,
b3=2.2822,
r4=infinite (aperture),
d4=0.65, and
b4=3.763.

The designation of respective reference numerals is identical to that of the first embodiment. The objective lens 5 is aspherical in both surface, and its focal distance f1=3.136 mm.

The focal distance of the concave lens may be derived from above numerals, f2=−37.575 mm, and since disk thickness for high density recording t1=0.6 mm, disk thickness for CD t2=1.2 mm, thus can be determined as follows:

$$\text{eq. (1)} = |-37.575 * (0.6 - 1.2)/3.136|$$
$$= 7.1891.$$

The value of wave aberration with decentering of the objective lens 5 and the aperture 7 in the context of FIG. 1B is as follows:

Second embodiment: Wavelength=650 nm, value of eq. (1)=7.1891

| with decentering of: (mm) | wave aberration of: ($\lambda$rms) |
| --- | --- |
| 0 | 0.005 |
| 0.1 | 0.005 |
| 0.2 | 0.006 |
| 0.3 | o.011 |
| 0.4 | 0.017 |

In this second embodiment may have been achieved the wave aberration better than the first embodiment.

The third embodiment will be described below. This third embodiment has the same basic structure to that of the first embodiment, as similar to the second embodiment, as shown in FIGS. 1(a) and 1(b) except for the difference in the concave lens 3 and the aperture 4. Similar to the second embodiment, the concave lens 3 is make in the form of concave-meniscus lens. Followings are exemplary values:

Wavelength=650 nm,
r1=−14,
d1=1,
n1=1.52246,
r2=−50,
d2=8.5,
r3=infinite (aperture), d3=6.5, b3=2.2898, r4=infinite (aperture), d4=0.65, and b4=3.763.

The designation of respective reference numerals is identical to that of the first embodiment. The objective lens 5 is aspherical in both surface, and its focal distance f1=3.136 mm.

The focal distance of the concave lens may be derived from above numerals, f2=−37.575 mm, and since disk thickness for high density recording t1=0.6 mm, disk thickness for CD t2=1.2 mm, thus can be determined as follows:

$$\text{eq. (1)} = |{-37.575} * (0.6 - 1.2)/3.136|$$
$$= 7.1891.$$

The value of wave aberration with decentering of the objective lens 5 and the aperture 7 in the context of FIG. 1B is as follows:

Third embodiment: Wavelength=650 nm, value of eq. (1)= 7.1891

| with decentering of: (mm) | wave aberration of: (λrms) |
|---|---|
| 0 | 0.005 |
| 0.1 | 0.005 |
| 0.2 | 0.005 |
| 0.3 | 0.006 |
| 0.4 | 0.010 |

In this third embodiment may have been achieved the wave aberration better than the first embodiment, as have done the second embodiment.

Now the fourth embodiment will be described below. This fourth embodiment has the same basic structure to that of the first embodiment, as shown in FIGS. 1(a) and 1(b) except for the difference in the concave lens 3 and the aperture 4. Similar to the second and third embodiments, the concave lens 3 is make in the form of concave-meniscus lens. Followings are exemplary values:

Wavelength=650 nm, r1=40, d1=1, n1=1.52246, r2=1.5, d2=0.51 r3=infinite (aperture), d3=3, b3=2.4506, r4=infinite (aperture), d4=0.65, and b4=3.763.

The designation of respective reference numerals is identical to that of the first embodiment. The objective lens 5 is aspherical in both surface, and its focal distance f1=3.136 mm.

The focal distance of the concave lens may be derived from above numerals, f2=−46.576 mm, and since disk thickness for high density recording t1=0.6 mm, disk thickness for CD t2=1.2 mm, thus can be determined as follows:

$$\text{eq. (1)} = |{-46.576} * (0.6 - 1.2)/3.136|$$
$$= 8.9112.$$

The feature specific to this fourth embodiment is that the concave lens 3 is located in the proximity of the objective lens 5, nearer than the second and third embodiments. Accordingly if the image side NA is the same, the efficiency of the use of the light beam emitted from the collimation lens 2 may be higher than the first and second and third embodiments.

The value of wave aberration with decentering of the objective lens 5 and the aperture 7 in the context of FIG. 1B is as follows:

Fourth embodiment: value of eq. (1)=8.9112

| with decentering of: (mm) | wave aberration of: (λrms) |
|---|---|
| 0 | 0.003 |
| 0.1 | 0.006 |
| 0.2 | 0.013 |
| 0.3 | 0.023 |
| 0.4 | 0.036 |

In this fourth embodiment may have been achieved the correction of the wave aberration much better than the first embodiment, but not as good as the second and third embodiment.

Next, the fifth embodiment will be described below. In relation to the efficiency of the use of the light beam as described above, if the image side NA of the objective lens 5 is predefined, the efficiency is higher because the diameter of the light bundle emitted from the collimator lens 2 is so large that a larger amount of light can be captured when the divergence of the concave lens 3, namely the power of the lens 3 in FIG. 1B is as weak as possible, i.e., the focal distance of the lens 3 is as long as possible. By using this in order to minimize the power of the concave lens 3, it may be conceivable that the most part of the aberration correction is made with the aspherical effect as described above with the remainder of the correction being done by adding a few power to the concave lens 3. Followings are exemplary values of the fifth embodiment:

Wavelength=650 nm, r1=80, d1=1, n1=1.52246, r2=30*, d2=8.5, r3=infinite (aperture), d3=6.5, b3=2.3668, r4=infinite (aperture), d4=0.65, and b4=3.763.

Where r2 above with an asterisk (*) is aspherical; the distance Z between a point on the lens surface at the height H from the light axis and the vertex of the lens surface (on the light axis) along with the light axis may be given by:

$$Z=CH^2/[1+\{1-(K+1)C^2H^2\}^{1/2}]+A4H^4+A6H^6+A8H^8+A10H^{10} \quad \text{eq. (2)}$$

The indices for the above equation is as follows:

C=0.033333 (=1/r2),

K=−140.8849,
A4=0.0001016542,
A6=0.0001424704,
A8=−0.0004761886, and
A10=0.0002258372.

The designation of respective reference numerals is identical to that of the first embodiment. The objective lens 5 is aspherical in both surface, and its focal distance f1=3.136 mm.

The focal distance of the concave lens may be derived from above numerals, f2=−92.508 mm, and since disk thickness for high density recording t1=0.6 mm, disk thickness for CD t2=1.2 mm, thus can be determined as follows:

$$\text{eq. (1)} = |-92.508 * (0.6 - 1.2)/3.136|$$
$$= 17.699.$$

The value of wave aberration with decentering of the objective lens 5 and the aperture 7 in the context of FIG. 1B is as follows:

Fifth embodiment: Wavelength=650 nm, value of eq. (1)= 17.699

| with decentering of: (mm) | wave aberration of: (λrms) |
|---|---|
| 0 | 0.003 |
| 0.1 | 0.034 |
| 0.2 | 0.070 |
| 0.3 | 0.112 |
| 0.4 | 0.161 |

In this fifth embodiment which uses an aspherical lens, the correction of the wave aberration may not be as good as the above cited first, second, third, and fourth embodiments which do not use aspherical lens. However these values are better than that with an aspherical correction plate having infinite focal distance as described above. When the tolerance of the wave aberration is made at the Marechal criterion, 0.07 λrms, the amount of decentering up to 0.2 mm may be allowed.

Now the sixth embodiment will be described below. This embodiment is aimed to render the same effect to the fifth embodiment above, and its exemplary values are as follows:

r1=80*,
d1=1,
n1=1.52246,
r2=30*,
d2=8.5,
r3=infinite (aperture),
d3=6.5,
b3=2.4026,
r4=infinite (aperture),
d4=0.65, and
b4=3.763.

Where r1 and r2 above with an asterisk (*) are aspherical; the distance Z between a point on the lens surface at the height H from the light axis and the vertex of the lens surface (on the light axis) along with the light axis may be given by the equation (2). The respective indices in the equation (2) will be as follows:

r1 surface:
C=0.0125 (=1/r1)
K=14667.89
A4=−0.002849608
A6=−0.001251363
A8=−0.000353984
A10=0.0002405828 r2 surface:
C=0.033333 (=1/r2)
K=−981.1234
A4=−0.002278924
A6=−0.001105453
A8=−0.0005556336
A10=−0.0001180289.

The designation of other respective reference numerals is identical to that of the first embodiment. The objective lens 5 is aspherical in both surface, and its focal distance f1=3.136 mm.

The focal distance of the concave lens may be derived from above numerals, f2=−92.508 mm, and since disk thickness for high density recording t1=0.6 mm, disk thickness for CD t2=1.2, thus can be determined as follows:

$$\text{eq. (1)} = |-92.508 * (0.6 - 1.2)/3.136|$$
$$= 17.699.$$

The value of wave aberration with decentering of the objective lens 5 and the aperture 7 in the context of FIG. 1B is as follows:

Sixth embodiment: Wavelength=650 nm, value of eq. (1)= 17.699

| with decentering of: (mm) | wave aberration of: (λrms) |
|---|---|
| 0 | 0.003 |
| 0.1 | 0.033 |
| 0.2 | 0.068 |
| 0.3 | 0.109 |
| 0.4 | 0.158 |

In this sixth embodiment, the correction of the wave aberration is slightly better than the above fifth embodiment. FIG. 7 shows the characteristics of wave aberration of said first to sixth embodiments and said aspherical correction plate, and when only the aperture 4 is inserted/removed without the concave lens 3 in the FIG. 1B.

In the first to sixth embodiments although the concave lens 3 plays the role of aberration correction, it may be sufficient to use an optical element with negative focal distance, such as a gradient index lens and a Fresnel lens.

Also, the said first to sixth embodiments have been described having infinite optical system with a collimator lens. However, the aberration correction may be achievable in the finite optical system without collimator lens, found in some CD player.

Figure 8A:
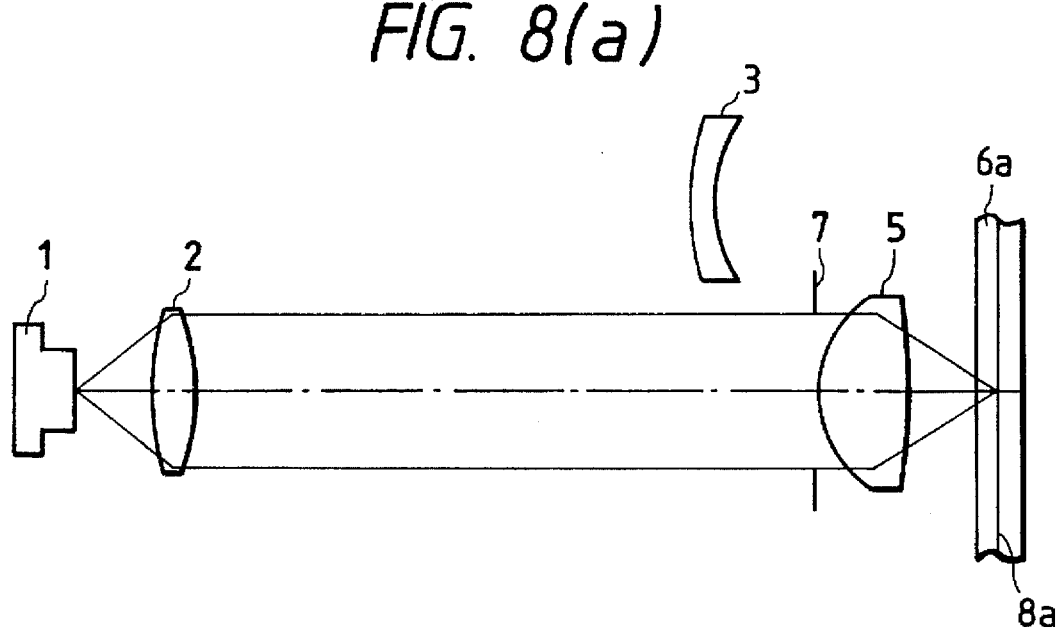
FIGS. 8(a) and 8(b) shows a transverse sectional view indicating an embodiment in accordance with the present invention with the aperture 4 being removed from the arrangement shown in FIG. 1.
Figure 8B:
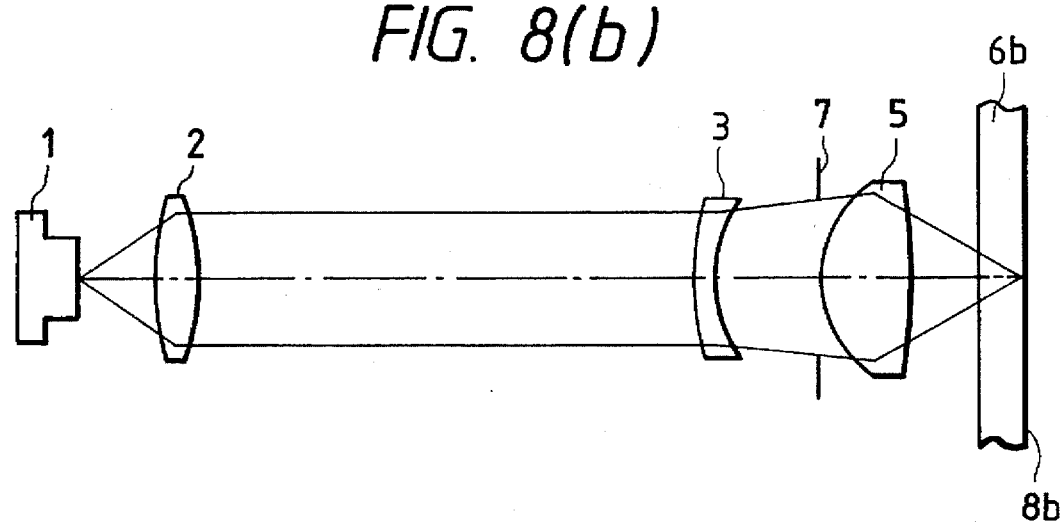

In the said first to sixth embodiments, the aperture 4 is shown effective when the concave lens 3 resides along with the light path. In case in which it is not necessary to shrink the image side NA in the FIG. 1B the aperture 4 is omittable, and the arrangement as shown in FIGS. 8(a) and 8(b) may be used instead. In FIGS. 8(a) and 8(b), the image side NA is determined by the aperture 7 even when the concave lens 3 is in the light path.

Figure 9A:
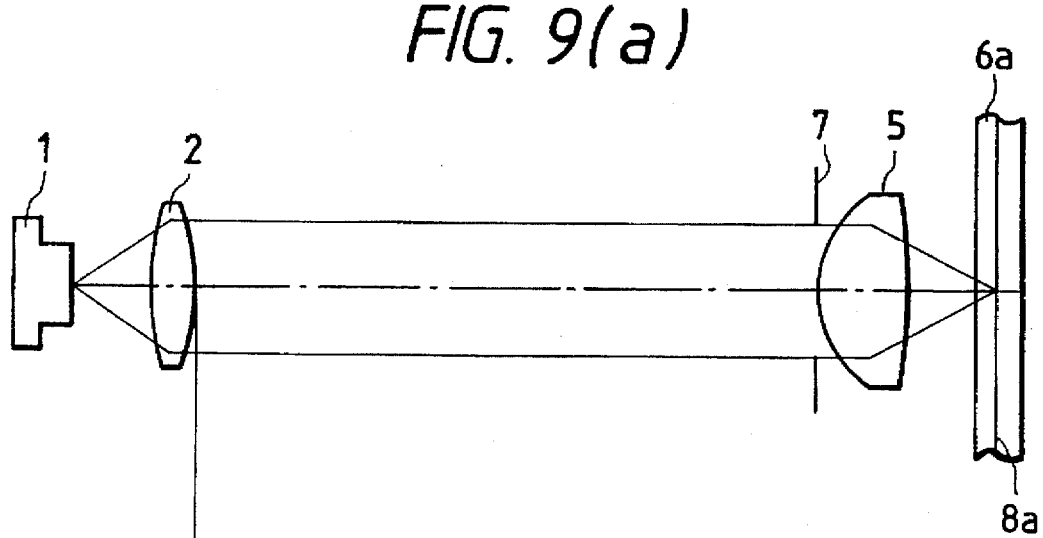
FIGS. 9(a) and 9(b) shows a transverse sectional view indicating another embodiment in accordance with the present invention with the collimator lens moved.
Figure 9B:
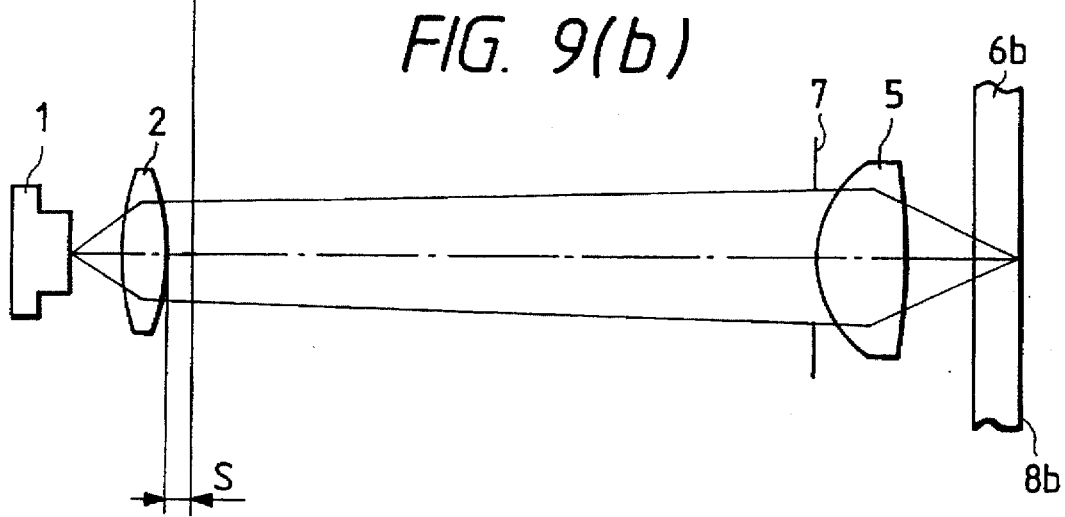
Figure 10A:
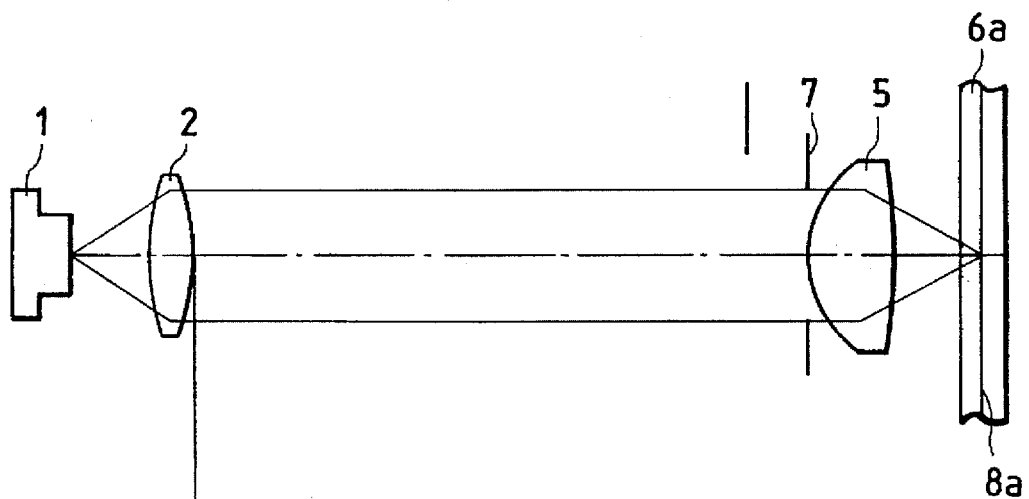
FIGS. 10(a) and 10(b) shows a transverse sectional view indicating seventh embodiment in accordance with the present invention.
Figure 10B:
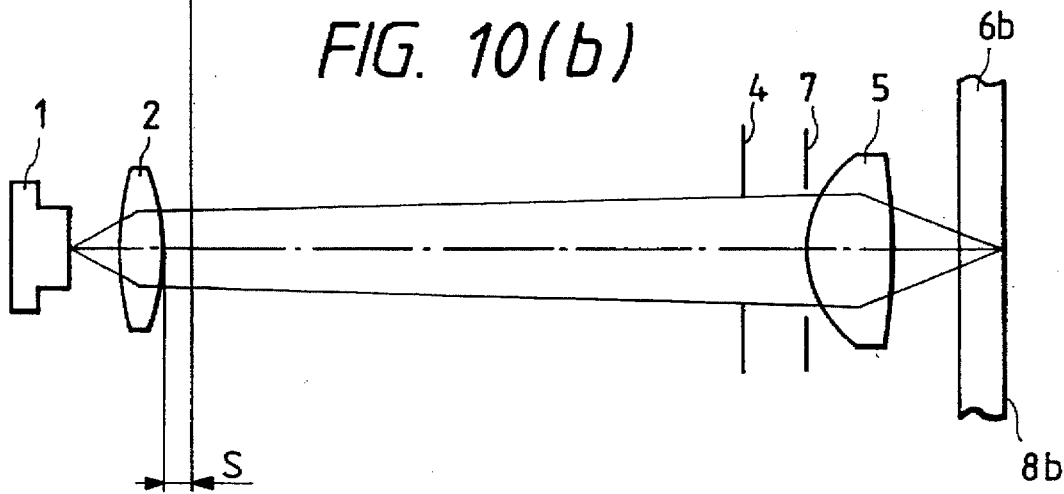

To previously add some spherical aberration to be further corrected in order to improve spherical aberration in the direction of over correction, the method as has been described of:

(B) move either the light source or the collimator lens along with the light axis so as to cause the light beam incident to the objective lens to enter as divergent light;

is also effective for a method of the correction of aberration. In such a case the arrangement may be as shown in FIGS. 9(a) and 9(b) and FIGS. 10(a) and 10(b). In FIG. 9B, the collimator lens 2 is moved to the left side by a distance S, from the position as shown in FIG. 9A. The light emitted from the collimator lens 2 passes through the aperture 7 as divergent light into the objective lens 5, to converge into the disk recording surface 8b with aberration well corrected. The arrangement as shown in FIG. 10 is similar to that of FIGS. 9(a) and 9(b) and comprises further the aperture 4, which is removed out of the light path in the FIG. 10A and inserted to the light path in the FIG. 10B to perform as an aperture for determining the image side NA. Other functionalities are identical to FIGS. 9(a) and 9(b).

There may be cases where the efficiency of the use of light as stated before is not so good. When comparing with said embodiments, however, it has a merit that the optical element having negative focal distance may not be required. Exemplary values according to this method as the seventh embodiment may be as follows:

Focal distance of the collimator lens 2=25 mm, and

Amount of movement in the light path of the collimator lens 2=9.59 mm.

In such a case the wave aberration in FIG. 10B may be 0.009 λrms.

The efficiency of the use of light described above will be described in greater details below.

Figure 11A:
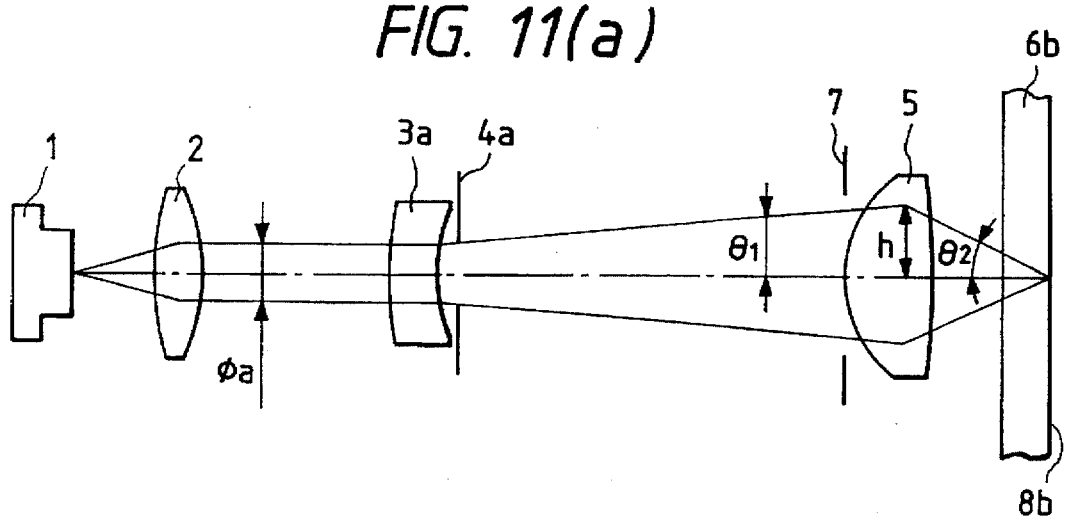
FIGS. 11(a) and 11(b) shows a transverse sectional view indicating the arrangement of the first to sixth embodiment as well as the height of the light and the diameter of the parallel light bundle.
Figure 11B:
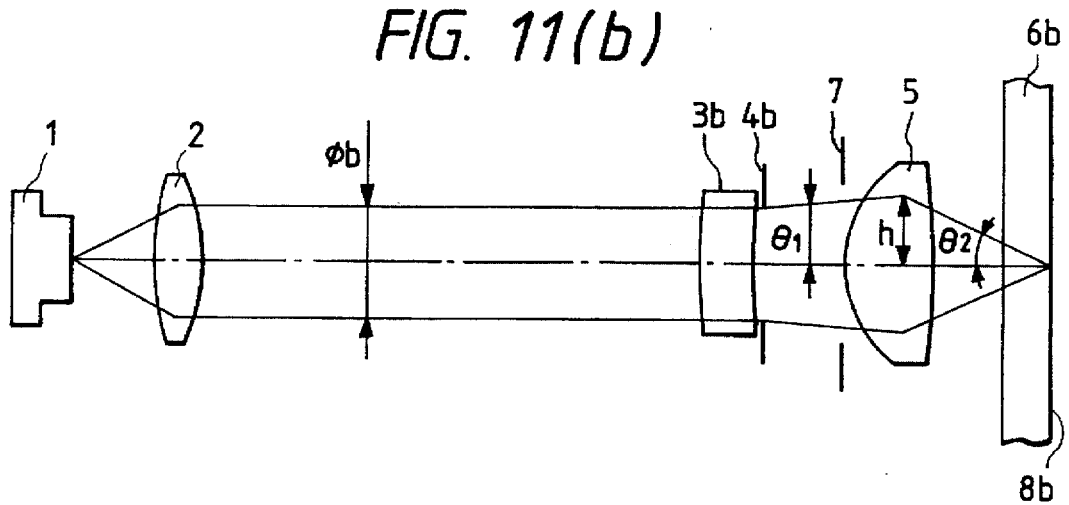

FIGS. 11(a) and 11(b) shows an arrangement and the height of the light and the diameter of parallel light bundle for playing back or recording and playing back thicker CD disk in the first to sixth embodiments. In FIG. 11A the distance between the concave lens 3a and the objective lens 5 is larger, in FIG. 11B the distance between the concave lens 3b and the objective lens 5 is smaller.

As shown in FIG. 11B and in FIG. 11A, when the image side NA of the objective lens 5 (=sin θ2) is set to a value, if a prerequisite is that the aberration is corrected for the thickness of disk 6b, the height of the incident light h and the angle of the incident light θ1 into the objective lens 5 are needed to be set to a predetermined value, respectively. Since the incident light height h and the incident light angle θ1 are same in both FIG. 11A and FIG. 11B, the parallel light bundle diameter φb between the collimator lens 2 and the concave lens 3b when the distance between the concave lens 3b and the objective lens 5 is small (FIG. 11B) is larger than the parallel light bundle φa between the collimator lens 2 and the concave lens 3a when the distance between the concave lens 3a and the objective lens 5 is larger. Accordingly, when considering the power and the efficiency of the light from the laser 1, the parallel light bundle φa and φb should retain a redetermined size, and it is preferable that the distance between the object lens 5 and respective concave lens 3a and 3b may be less than a predetermined value. When the distance between the objective lens 5 and the concave lens 3a is larger the incident parallel light beam height to the concave lens 3a becomes low, and the absolute value of the power of the concave lens 3a (=inverse of the focal distance) is required to be increased. On the other hand when the distance between the objective lens 5 and the concave lens 3b is small, the incident parallel light beam height into the concave lens 3b becomes high, and the absolute value of the power of the concave lens 3b is not necessarily required to be increased.

From above statement, in respect to the efficiency of the use of light, the focal distance f2 of the concave lens preferably satisfies the following equation (3):

$$6 < \sqrt{2 \cdot |1-t2|/f1} < 25, \qquad \text{eq. (3)}$$

where f2: focal distance of concave lens, (t1–t2): difference of disk plate of different thickness, and f1: focal distance of objective lens.

In the first to sixth embodiments according to the present invention as have been described above, the second, third, fourth, fifth, and sixth embodiments satisfy the above equation. In case in which there are some margin in respect to the efficiency of the use of light it may be possible to exceed the range from the lower limit of the equation (3) above.

In summary, the efficiency of the use of light in the first to sixth embodiments according to the present invention may be summarized as follows.

|  | parallel light bundle dia. | distance concave-objective | value of eq. (1) |
| --- | --- | --- | --- |
| No concave lens | 2.51 | — | — |
| 1st embodiment | 1.56 | 20.65 | 5.6761 |
| 2nd embodiment | 1.87 | 15.65 | 7.1891 |
| 3rd embodiment | 1.83 | 15.65 | 7.1891 |
| 4th embodiment | 2.44 | 4.15 | 8.9112 |
| 5th embodiment | 2.20 | 15.65 | 17.699 |
| 6th embodiment | 2.21 | 15.65 | 17.699. |

In the above table the distance of the concave lens—objective lens designates to the distance from the vertex of the surface of the optical element distant from the light source, along with the light axis, to the vertex of the surface of the objective lens nearer to the light source, along with the light axis. In either case, the focal distance of the objective lens is 3.136 mm, image side NA is 0.4.

The efficiency of the use of light is directly proportional to the square of the parallel light bundle diameter multiplied by the light intensity of laser at the emission angle. For instance, if a value more than 40% is required for the squared parallel light bundle diameter without concave lens, the parallel light bundle diameter required is 1.59 mm, and it can be appreciated that if the concave lens is spherical, then the distance from the concave lens to the objective lens should be less than 20 mm from the first to fourth embodiments in the table above.

Although the squared parallel light bundle diameter may be retained to more than 40% even when the distance from the concave lens to the objective lens is more than 20 mm if the concave lens is aspherical, the aberration characteristics at the decentering of the objective lens as have been stated in the fifth and sixth embodiments may not be improved as well as the case of spherical lens.

The minimum distance between the concave lens and the objective lens will be 0.2 mm from the structural constraint, when considering the accuracy of the insertion/removal mechanism of the concave lens. Therefore the distance from the concave lens to the objective lens preferably satisfies the equation (5) bellow:

$$0.2 \text{ mm} \leq x \leq 20 \text{ mm}, \qquad \text{eq. (5)}$$

where x is the distance from the vertex of the surface of the concave lens distant from the light source, along with the light axis, to the vertex of the surface of the objective lens nearer to the light source, along with the light axis.

When considering that the image operation displaces the objective lens in the direction parallel to the light axis, it is preferable that the equation (6) below also be satisfied:

$$1.5 \text{ mm} \leq x \leq 20 \text{ mm}, \qquad \text{eq. (6)}$$

where x is the distance from the vertex of the surface of the concave lens distant from the light source, along with the light axis, to the vertex of the surface of the objective lens nearer to the light source, along with the light axis.

In case in which a value more than 60% is required for the squared parallel light bundle diameter, or in which the dimension of the apparatus is required to be minimized, it is further preferable that the equation (7) bellow instead of equation (5) above be satisfied:

$$0.2 \text{ mm} \leq x \leq 14 \text{ mm}, \qquad \text{eq. (7)}$$

where x is the distance from the vertex of the surface of the concave lens distant from the light source, along with the light axis, to the vertex of the surface of the objective lens nearer to the light source, along with the light axis.

It is most preferable to satisfy equation (8) below:

$$1.5 \text{ mm} \leq x \leq 14 \text{ mm}, \qquad \text{eq. (8)}$$

where x is the distance from the vertex of the surface of the concave lens distant from the light source, along with the light axis, to the vertex of the surface of the objective lens nearer to the light source, along with the light axis.

Figure 12:
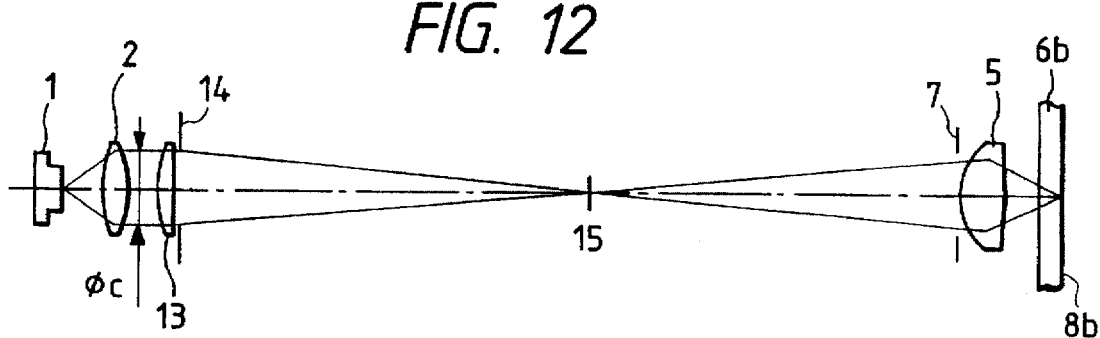
FIG. 12 shows a transverse sectional view indicating eighth and ninth embodiment of the present invention.

Next, from above mentioned methods of aberration correction, (A) insert an optical element having negative image distance at the light source side of the objective lens (such as a concave lens) in order to incident the light into the objective lens as divergent light; and (B) move either the light source or the collimator lens along with the light axis so as to cause the light beam incident to the objective lens to enter as divergent light;

it may be concluded that, for the aberration correction, the light incident to the objective lens may be divergent light, and that an arrangement as shown in FIG. 12 may be conceivable in respect to the efficiency of the use of light as stated above.

In FIG. 12, the aberration is corrected by using a convex lens 13 to emit divergent light into the objective lens 5, in which the parallel light bundle passed from the collimator lens 2 is converged by the convex lens 13 into a first image point 15, then the light bundle become thereafter divergent light to be incident into the objective lens 5. The light bundle may be converged on the recording surface 8b of the disk 6b with the aberration well corrected, as similar to the case with a concave lens.

In FIG. 12, it will be clearly appreciated that the distance from the convex lens 13 to the first image point 15 should be retained to a predetermined value or more, if not the efficiency of the use of light decreases because the value $\phi c$ as shown in FIG. 12 become small. Therefore it is preferable that the power and the focal distance of the convex lens 13 satisfy the equation (4) below:

$$6 < |f3 * t1 - t2)/f1| < 25, \qquad \text{eq. (4)}$$

where f2: focal distance of convex lens, (t1−t2): difference of disk plate of different thickness, and f1: focal distance of objective lens.

If smaller than the lower limit of the above equation (4), then the focal distance f3 of the convex lens becomes too small and the power becomes too large so that the correction of the aberration will be difficult or that the efficiency of the use of light becomes aggravated.

If larger than the upper limit of the above equation (4), then the focal distance f3 of the convex lens becomes too large and the power becomes too small so that the optical disk apparatus itself becomes large, or that the aberration characteristics at decentering of the objective lens aggravates if the aberration is corrected by using an aspherical convex lens with insufficient distance from the convex lens to the objective lens.

Accordingly, exemplary values of the convex lens of the eighth embodiment as shown in FIG. 12 will be as follows:

Wavelength=650 nm, r1=19.6, d1=1, n1=1.51405, r2=infinite, d2=0.65, r3=infinite (aperture), d3=98.8, b3=1.6618, r4=infinite (aperture), d4=0.65, and b4=4.044.

The designation of respective reference numerals is similar to that of the first embodiment, and is as follows:

r1: curvature of the convex lens 13 of the surface near the laser, r2: curvature of the convex lens 13 of the surface near the objective lens, r3: curvature of the aperture 14, r4: curvature of the aperture 7, d1: depth in the center of the convex lens 13, d2: distance from the vertex of the surface of the convex lens 13 near the objective lens to the aperture 14 along with the light axis, d3: distance from the aperture 14 to the aperture 7 along with the light axis, d4: distance from the aperture 7 to the vertex on the light axis, of the surface near the laser, of the objective lens 5 along with the light axis, b3: diameter of the aperture 14, b4: diameter of the aperture 7, and n1: refractive index of the convex lens.

The objective lens 5 is aspherical, and has focal distance f1=3.37 mm. The focal distance of the convex lens is according to the above figures f3=38.128 mm, and the thickness of high density recording disk t1=0.6 mm, and the thickness of CD disk t2=1.2 mm, thus $$\text{eq. (4)} = |38.128 * (0.6 - 1.2)/3.37|$$
$$= 6.7884.$$

Following are values of wave aberration when the objective lens 5 and the aperture 7 are decentered in the context of FIG. 12:

Eighth embodiment: Wavelength=650 nm, value of eq. (4)=6.7884

| with decentering of: (mm) | wave aberration of: (λrms) |
| --- | --- |
| 0 | 0.005 |
| 0.1 | 0.007 |
| 0.2 | 0.013 |
| 0.3 | 0.020 |
| 0.4 | 0.031 |

Followings are exemplary values of the ninth embodiment comprising the arrangement as shown in FIG. 12:

Wavelength=650 nm,
r1=28.9,
d1=1,
n1=1.51405,
r2=infinite,
d2=0.65,
r3=infinite (aperture),
d3=117,
b3=2.474,
r4=infinite (aperture),
d4=0.65, and
b4=4.044.

The designation of respective reference numerals is identical to that of the eighth embodiment.

The objective lens 5 is aspherical in both surfaces, of focal distance f1=3.37 mm. The focal distance of the convex lens is according to the above figures f3=56.22 mm, and the thickness of high density recording disk t1=0.6 mm, and the thickness of CD disk t2=1.2 mm, thus:

$$\text{eq. (4)} = |56.22 * (0.6 - 1.2)/3.37|$$
$$= 10.0095.$$

Followings are values of wave aberration when the objective lens 5 and the aperture 7 are decentered in the context of FIG. 12:
Ninth embodiment: Wavelength=650 nm, value of eq. (4)= 10.0095

| with decentering of: .(mm) | wave aberration of: (λrms) |
| --- | --- |
| 0 | 0.005 |
| 0.1 | 0.007 |
| 0.2 | 0.013 |
| 0.3 | 0.020 |
| 0.4 | 0.032 |

As shown in said eighth and ninth embodiments, the distance from the convex lens to the objective lens becomes very large as compared to the case with a concave lens, it may be apparent that such an appropriately located mirror is effective to decrease the size of the apparatus in case of application to a concrete apparatus.

Figure 13:
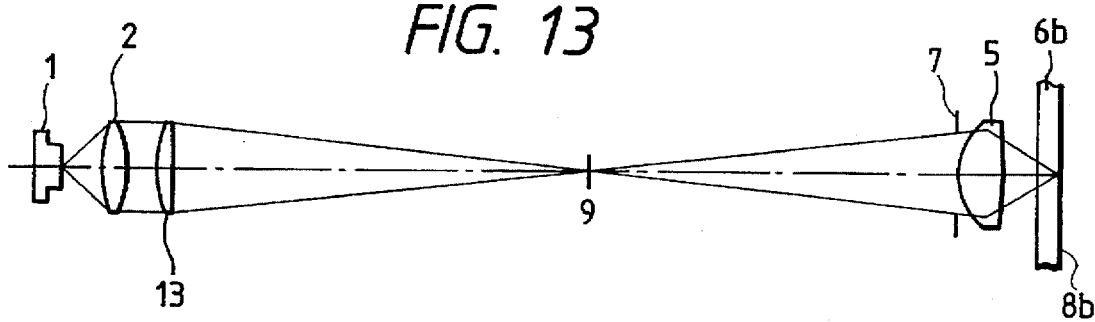
FIG. 13 shows a transverse sectional view indicating an embodiment with the aperture 4 removed from the arrangement of FIG. 1.

Also the eighth and ninth embodiments, as shown in FIG. 12, are shown with aperture 14 operating when a convex lens 13 is located in the light path. If in the context of FIG. 12, image side NA is not necessary to be small, the aperture 14 may be removed, thus the arrangement shown in FIG. 13 can be derived. In FIG. 13, the image side NA is always determined by the aperture 7 even with the convex lens 3 being in the light path.

Next, the entire system of the optical disk apparatus according to the present invention will be described in conjunction with FIG. 14.

Figure 14:
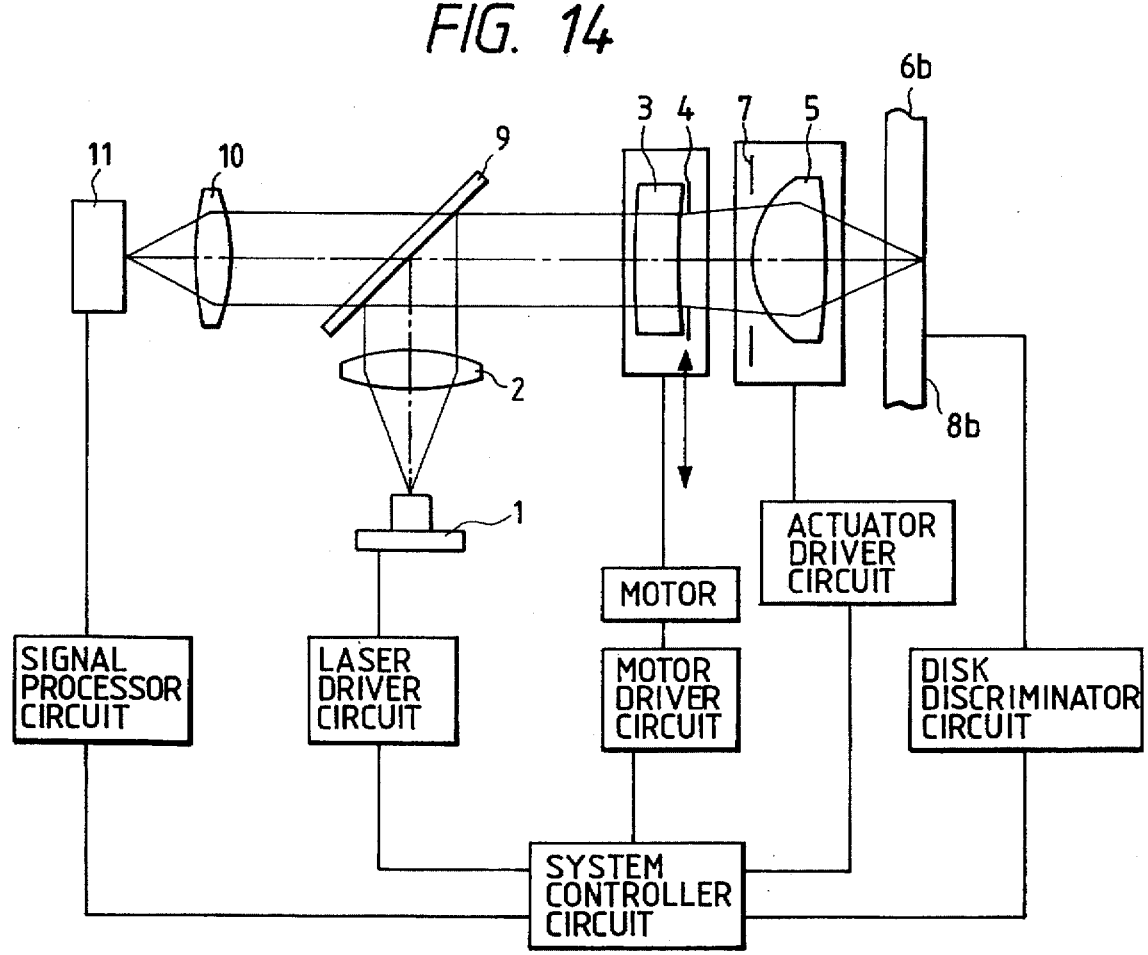
FIG. 14 shows a schematic diagram indicating the arrangement of the entire system of the optical disk apparatus in accordance with the present invention.

FIG. 14 shows a schematic diagram indicating the arrangement of the entire system of the optical disk apparatus in accordance with the present invention. The concave lens 3 and the aperture 4 may be inserted/removed into/from the light path of the optical system as shown by an arrow in the FIG. 14.

When the concave lens 3 and the aperture 4 are inserted in the light path, the light beam emitted from the laser 1 becomes parallel light beam by the collimator lens 2, then reflected by a half-mirror 9 to the concave lens 3 to provide divergent light, the aperture 4 determines the light bundle diameter so as to define the image side NA. The light bundle is converged by the objective lens 5 onto the recording surface 8b of the disk plate 6b. The light reflected from the disk recording surface 8b reenters to the objective lens 5 then passes through the concave lens 3 to become once again parallel light beam, which beam is passing through the half-mirror 9 to direct to a detector optics 10 and then to be collected onto a photodiode 11.

When the concave lens 3 and the aperture 4 are not inserted into the light path, the light beam emitted from the laser 1 becomes parallel light beam by the collimator lens 2, then reflected by a half-mirror 9, and the aperture 4 determines the light bundle diameter so as to define the image side NA. The light bundle is converged by the objective lens 5 onto the recording surface 8b of the disk plate 6b. The light reflected from the disk recording surface 8b reenters to the objective lens 5 to become once again parallel light beam, which beam is passing through the half-mirror 9 to direct to a detector optics 10 and then to be collected onto a photodiode 11.

A laser driver circuit drives the laser 1 to control the on/off of light-emission, and the output power of emitted light. The output of the photodiode 11 is supplied to a signal processing circuitry for generating focus error signal, tracking error signal, main signal and so on. These signals are supplied to system controller circuit to drive an actuator via an actuator driver circuit when the actuator is to be driven, for moving together the object lens 5 and the aperture 7.

In FIG. 14, disk discriminator means distinguish the thickness and the type of disk inserted to the optical disk apparatus to output the results to the system controller circuit. For an appropriate disk discriminator means, a method of detecting optically or mechanically the thickness of a disk plate, or a method of detecting an identification mark recorded on the disk or the cartridge of the disk may be used.

Alternatively, another method may be used in which disk type and thickness may be determined by playing back disk signal by assuming a thickness and a type of the disk, if normal signal cannot be obtained the disk is determined to be another thickness or type.

The system controller circuit determines whether or not to insert the concave lens 3 and the aperture 4 into the light path based on the resulting determination received from the disk discriminator, determines whether or not the status of the apparatus is to change from the current status in relation to the insertion/removal of the concave lens 3 and the aperture 4, and transmits signals to a motor driver circuit to drive the motor when the status of the apparatus has to be changed from the current status. The operation of the motor driving circuit drives the motor to insert/remove the concave lens 3 and the aperture 4.

In FIG. 14, a concave lens 3 is shown. However the present invention may be applied similarly to a convex lens. In addition, in case in which laser or collimator lens has to be moved along with the light axis according to the method (B) as described above, motor is to drives the laser 1 or the collimator lens 2 in the direction of the light axis.

In the above described embodiments, disk plates have been assumed to have two distinct thicknesses. However for recording or playing back on the disk plate of three or more different thicknesses, another optical element having negative focal distance may be provided, or another optical element having positive focal distance may be provided, or the collimator lens is to be moved.

As can be seen from above description, in accordance with the present invention, only one objective lens may be effectively used for well correcting aberration even with disk thickness being changed. Furthermore, the correction of aberration may be well performed even when the objective lens is decentering due to the tracking servo.

While we have shown and described several embodiments in accordance with our invention, it should be understood that disclosed embodiments are susceptible of changes and modifications without departing from the scope of the invention. Therefor, we do not intend to be bound by the details shown and described herein but intend to cover all such changes and modifications a fall within the ambit of the appended claims.

We claim:

1. An optical disk apparatus comprising an optical head with a light source and an objective lens, wherein said optical disk apparatus being capable of playing back and/or recording onto a plurality of types of disks having different thickness from a surface in the side in the face of the optical head to a recording surface, said apparatus comprising:

disk discriminator means for distinguishing the type of the disk being inserted;

an optical element having a predetermined focal distance for being disposed removably in the light path between the light source of the optical head and the objective lens;

an optical element driving means for switchably moving said optical element so as to insert it into said light path and to remove it therefrom; and controller means for selectively driving said switchable movement by the optical element apparatus means based on the determination of the disk discriminator means, wherein said apparatus may satisfy an equation given by:

$$3 < |f2*(t1-t2)/f1| < 25,$$

where f1: the focal distance of the objective lens, f2: the focal distance of the optical element, and (t1–t2): difference of said thicknesses between said different type of disks.

2. An optical disk apparatus set forth in claim 1, in which said optical disk apparatus may satisfy the following equation:

$$6 < |f2*(t1-t2)/f1| < 25.$$

3. An optical disk apparatus set forth in claim 1, in which said predetermined focal distance of said optical element has a positive value.

4. An optical disk apparatus set forth in claim 1, further comprising:

aperture means disposed removably in the light path between said light source and said objective lens, for lessening image side numerical aperture (image side NA); and aperture driving means for switchably moving said aperture means so as to insert it into said light path and to remove it therefrom, wherein said controller means selectably driving said switchable movement by said aperture driving means along with the switchable movement by said optical element driving means, based on the determination of said disk discriminator means.

5. An optical disk apparatus set forth in claim 1, in which said predetermined focal distance of said optical element has a negative value.

6. An optical disk apparatus set forth in claim 5, in which said optical disk apparatus may satisfy the following equation:

$$0.2 \text{ mm} \leq x \leq 20 \text{ mm},$$

where x designates to the distance from the vertex of the surface of the optical element distant from the light source, along with the light axis, to the vertex of the surface of the objective lens nearer to the light source, along with the light axis.

7. An optical disk apparatus set forth in claim 6, in which said optical disk apparatus may satisfy the following equation:

$$1.5 \text{ mm} \leq x \leq 20 \text{ mm}.$$

8. An optical disk apparatus set forth in claim 6, in which said optical disk apparatus may satisfy the following equation:

$$0.2 \text{ mm} \leq x \leq 14 \text{ mm}.$$

9. An optical disk apparatus set forth in claim 6, in which said optical disk apparatus may satisfy the following equation:

$$1.5 \text{ mm} \leq x \leq 14 \text{ mm}.$$

10. An optical disk apparatus comprising an optical head including a light source, a collimator lens for making light from the light source substantially parallelism, and an objective lens, wherein said optical disk apparatus being capable of playing back and/or recording onto a plurality of types of disks having different thickness from a surface in the side in the face of the optical head to a recording surface, said apparatus comprising:

disk discriminator means for distinguishing the type of the disk being inserted;

moving means for changing the distance from said light source in said optical head to the collimator lens in the direction along with the light path; and controller means for driving said moving means to dispose said light source and said collimator lens in a predetermined distance based on the determination of said disk discriminator means.

11. An optical disk apparatus set forth in claim 10, further comprising:

aperture means disposed removably in the light path between said light source and said objective lens, for lessening image side numerical aperture (image side NA); and aperture driving means for switchably moving said aperture means so as to insert it into said light path and to remove it therefrom, wherein said controller means driving said moving means to dispose said light source and said collimator lens in a predetermined distance as well as selectably driving said switchable movement by said aperture driving means based on the determination of said disk discriminator means.

12. An optical head for use in an optical disk apparatus having a light source and an objective lens, and being capable of playing back and/or recording onto a plurality of types of disks with different thickness from the surface of the side in the face of said optical head to a recording surface, said optical head comprising:

an optical element having a predetermined focal distance disposed removably in the light path between said light source and said objective lens, in which said optical head may satisfy the following equation:

$$3 < |f2*(t1-t2)/f1| < 25,$$

where f1: the focal distance of the objective lens,
f2: the focal distance of the optical element, and
(t1−t2): difference of said thicknesses between said different type of disks.

13. An optical head set forth in claim 12, in which said optical head may satisfy the following equation:

$$6 < |f2*(t1-t2)/f1| < 25.$$

14. An optical head set forth in claim 12, in which said predetermined focal distance of said optical element has a positive value.

15. An optical head set forth in claim 12, further comprising aperture means disposed removably in the light path between said light source and said objective lens, for lessening image side numerical aperture (image side NA).

16. An optical head set forth in claim 12, in which said predetermined focal distance of said optical element has a negative value.

17. An optical head set forth in claim 16, in which said optical head may satisfy the following equation:

$$0.2 \text{ mm} \le x \le 20 \text{ mm},$$

where x designates to the distance from the vertex of the surface of the optical element distant from the light source, along with the light axis, to the vertex of the surface of the objective lens nearer to the light source, along with the light axis.

18. An optical head set forth in claim 17, in which said optical head may satisfy the following equation:

$$1.5 \text{ mm} \le x \le 20 \text{ mm}.$$

19. An optical head set forth in claim 17, in which said optical head may satisfy the following equation:

$$0.2 \text{ mm} \le x \le 14 \text{ mm}.$$

20. An optical head set forth in claim 17, in which said optical head may satisfy the following equation:

$$1.5 \text{ mm} \le x \le 14 \text{ mm}.$$

21. An optical head for use in an optical disk apparatus having a light source, a collimator lens for making light from the light source substantially parallelism, and an objective lens for playing back and/or recording onto a plurality of types of disks having different thickness from a surface in the side in the face of the optical head to a recording surface, wherein said light source and said collimator lens are retained for variably changing the distance therebetween along with the light path.

22. An optical head set forth in claim 21, further comprising aperture means disposed removably in the light path between said light source and said objective lens, for lessening image side numerical aperture (image side NA).

* * * * *